US012625935B2

(12) United States Patent
Song et al.

(10) Patent No.: US 12,625,935 B2
(45) Date of Patent: May 12, 2026

(54) METHODS AND DEVICES FOR PERFORMING BIOMETRIC AUTHENTICATION OF ELECTRONIC DEVICES

(71) Applicant: Suprema Inc., Seongnam-si (KR)

(72) Inventors: Bong Seop Song, Seongnam-si (KR); Jong Man Lee, Seongnam-si (KR); Jae Hyun Park, Seongnam-si (KR); Young Mook Kang, Seongnam-si (KR); Hochul Shin, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 246 days.

(21) Appl. No.: 18/518,290

(22) Filed: Nov. 22, 2023

(65) Prior Publication Data

US 2024/0202301 A1 Jun. 20, 2024

(30) Foreign Application Priority Data

Dec. 19, 2022 (KR) ........................ 10-2022-0178112

(51) Int. Cl.
| | |
|---|---|
| *H04L 29/06* | (2006.01) |
| *G06F 21/32* | (2013.01) |
| *G06V 40/12* | (2022.01) |
| *G06V 40/50* | (2022.01) |
| *G06V 40/60* | (2022.01) |

(52) U.S. Cl.
CPC .......... *G06F 21/32* (2013.01); *G06V 40/1365* (2022.01); *G06V 40/50* (2022.01); *G06V 40/67* (2022.01)

(58) Field of Classification Search
CPC ........ G06F 21/32; G06F 3/0486; G06F 21/36; G06F 21/45; G06V 40/1365; G06V 40/50; G06V 40/67
See application file for complete search history.

(56) References Cited

U.S. PATENT DOCUMENTS

| | | | | |
|---|---|---|---|---|
| 10,279,779 B1 * | 5/2019 | Lee | ........................ | B60R 25/252 |
| 11,676,423 B1 * | 6/2023 | Gudivada | .......... | G06V 40/1306 382/124 |
| 2017/0300682 A1 * | 10/2017 | Alten | .................. | H04L 63/0861 |
| 2019/0228139 A1 * | 7/2019 | Oh | .......................... | G06V 40/13 |
| 2020/0125708 A1 * | 4/2020 | Jeon | ........................ | G06V 40/63 |

FOREIGN PATENT DOCUMENTS

| | | |
|---|---|---|
| KR | 10-2018-0031511 A | 3/2018 |
| KR | 10-2019-0090260 A | 8/2019 |

OTHER PUBLICATIONS

Moon Nam Doo, "Office Action in Korean Application No. 10-2022-0178112", Jun. 25, 2024, KIPO, Republic of Korea.

* cited by examiner

*Primary Examiner* — William A Corum, Jr.
(74) *Attorney, Agent, or Firm* — Bridgeway IP Law Group, PLLC; Jihun Kim

(57) ABSTRACT

There is provided a method of registering authentication information. The method comprises generating a plurality of biometric information recognition areas on a display module of the electronic device; detecting an input of biometric information on at least one of the plurality of biometric information recognition areas; determining location information indicating at least one recognition region on which the input of biometric information is detected; and registering, as authentication information, the input biometric information and the location information.

15 Claims, 7 Drawing Sheets

DRAW UNLOCK PATTERN

EMERGENCY CALL

WHEN PATTERN IS DESIGNATED

FIG.4

WHEN SPECIFIC LOCATION IS DESIGNATED

WHEN PATTERN IS DESIGNATED

METHODS AND DEVICES FOR PERFORMING BIOMETRIC AUTHENTICATION OF ELECTRONIC DEVICES

CROSS-REFERENCE TO RELATED APPLICATIONS

This application claims the priority of Korean Patent Application No. 10-2022-0178112 filed on Dec. 19, 2022, in the Korean Intellectual Property Office, the disclosure of which is incorporated herein by reference.

TECHNICAL FIELD

The present disclosure relates to an electronic device having functions such as display and touch recognition.

This work was supported by Institute of Information & communications Technology Planning & Evaluation (IITP) grant funded by the Korea government (MSIT; Ministry of Science and ICT) (No. 2020-0-01787-001, Development of innovative communication and computing convergence technology for superintelligence services).

BACKGROUND

As mobile and network platform environments are activated, electronic devices having various functions are being released, and security issues in a trade-off relationship with various functionalities are attracting interest.

Although security issues in electronic devices are improved through fingerprint recognition techniques employing optical, capacitive, and ultrasonic methods, cases in which user's fingerprints remain on electronic devices cannot be completely excluded and thus security issues still exist

SUMMARY

An embodiment of the present disclosure provides an electronic device capable of enhancing security by diversifying a registration location of biometric information of a user and an authentication registration technique using the same.

An embodiment of the present disclosure provides an electronic device capable of enhancing security by registering a plurality of pieces of biometric information and an authentication registration technique using the same.

An embodiment of the present invention provides an electronic device capable of enhancing security by diversifying a biometric information recognition location and an authentication technique using the same.

An embodiment of the present invention provides an electronic device capable of enhancing security by recognizing a plurality of pieces of biometric information and an authentication technique using the same.

The aspects of the present disclosure are not limited to the foregoing, and other aspects not mentioned herein will be clearly understood by those skilled in the art from the following description.

In accordance with an aspect of the present disclosure, there is provided a method of registering authentication information of an electronic device, the method comprises: generating a plurality of biometric information recognition areas on a display module of the electronic device; detecting an input of biometric information on at least one of the plurality of biometric information recognition areas; determining location information indicating at least one recognition region on which the input of biometric information is detected; and registering, as authentication information, the input biometric information and the location information.

The plurality of biometric information recognition areas may include a plurality of lattice regions having each location information on the display module.

The method may include determining a request of a pattern registration; displaying a plurality of drag points on the display module; and determining a user drag input of connecting the plurality of drag points on the display module, and generating pattern information corresponding to the user drag input. The registering, as the authentication information, the input biometric information and location information may include registering, as the authentication information, the pattern information with the input biometric information and the location information.

The registering, as the authentication information, the input biometric information and location information may include determining whether the input biometric information is same a pre-registered biometric information; and registering, as the authentication information, the location information and the pre-registered biometric information when the input biometric information is same the pre-registered biometric information.

The registering, as the authentication information, the input biometric information and location information may include deleting the input biometric information when the input biometric information is same the pre-registered biometric information.

In accordance with another aspect of the present disclosure, there is provided an electronic device, the electronic device comprises: a display module; a biometric information recognition module included in the display module; a signal processor configured to generate a plurality of biometric information recognition areas for recognizing biometric information on the biometric information recognition module; a memory configured to store one or more instructions; and a processor configured to execute the one or more instructions stored in the memory, wherein the instructions, when executed by the processor, cause the processor to: detect an input of biometric information of a user on at least one of the plurality of biometric information recognition areas, determine location information indicating at least one recognition region on which the input of biometric information is detected, determine whether the input biometric information is same pre-registered biometric information included in pre-registered authentication information and whether the determined location information is same pre-registered location information included in the pre-registered authentication information, and permit access of the electronic device to the user if the input biometric information is same the pre-registered biometric information included in the pre-registered authentication information and the determined location information is same the pre-registered location information included in the pre-registered authentication information.

The processor may control the plurality of biometric information recognition regions to be displayed in a lattice form in which lattice regions have each location information at a partial area of the display module.

The processor may control the display module such that the lattice regions in the lattice form are moved based on a relative location between lattice regions in the partial area. Each lattice region may have indexes according to a column and a row. Information on the indexes may be maintained even if the lattice form is moved in the partial area.

The processor may determine whether pre-registered pattern information is present, control the signal processor to generate a plurality of drag points, and display the plurality of drag points generated by the signal processor on the display module.

The display module may include a touch panel. The processor may determine a user drag input of connecting the plurality of drag points on the display module, generate input pattern information corresponding to the user drag input, compare the input pattern information with the pre-registered pattern information, and permit the access of the electronic device a comparison result of the input pattern information and the pre-registered pattern information.

The plurality of biometric information recognition areas may indicate a location on the display module.

In accordance with another aspect of the present disclosure, there is provided a non-transitory computer-readable recording medium storing a computer program, which comprises instructions for a processor to perform a biometric authentication method of an electronic device, the method comprise: displaying a plurality of biometric information recognition areas on a display module of the electronic device; detecting an input of biometric information of a user on at least one of the plurality of biometric information recognition areas; determining location information indicating at least one recognition region on which the input of biometric information is detected; determining whether the input biometric information is same pre-registered biometric information included in pre-registered authentication information and whether the determined location information is same pre-registered location information included in the pre-registered authentication information; and permitting access of the electronic device to the user if the input biometric information is same the pre-registered biometric information included in the pre-registered authentication information and the determined location information is same the pre-registered location information included in the pre-registered authentication information.

According to an embodiment of the present disclosure, it is possible to input a plurality of pieces of biometric information, register, as authentication information, information on locations at which the plurality of pieces of biometric information is input together with the biometric information, and prevent forged authentication attempts or a biometric information recognition situation caused by a third party by using a plurality of pieces of biometric information recognized at various locations for authentication, thereby enhancing security of an electronic device. In particular, it is possible to further enhance security in platform environments such as electronic financial transaction systems and electronic commerce systems through a method of authenticating single or a plurality of piece of biometric information at a specific location of an electronic device.

BRIEF DESCRIPTION OF THE DRAWINGS

FIG. 4 is a diagram illustrating biometric information recognition areas in the authentication information registration method of FIG. 3.

DETAILED DESCRIPTION

Figure 1:
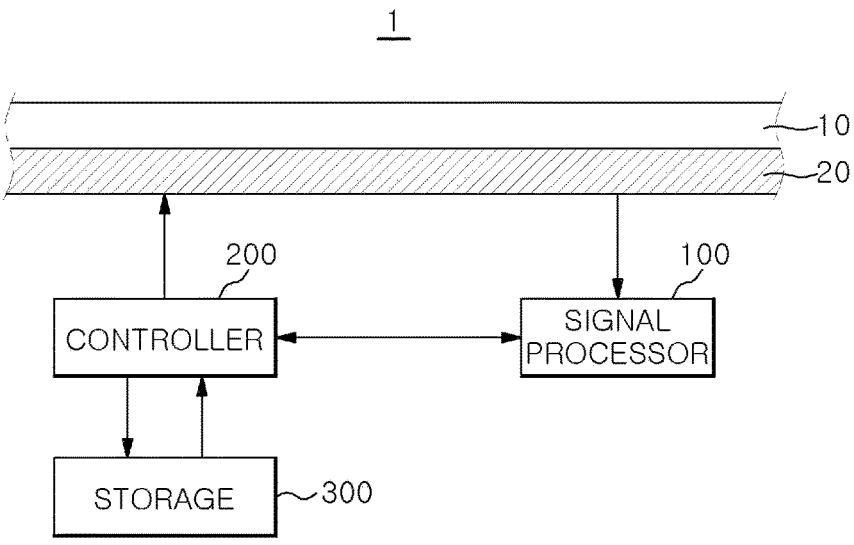
FIG. 1 is a configuration diagram of an electronic device according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

An embodiment of the present disclosure provides an electronic device capable of inputting a plurality of pieces of biometric information and registering, as use authentication information, information on locations at which a plurality of pieces of biometric information is input together with the biometric information, and an authentication registration technique using the same.

An embodiment of the present disclosure provides an electronic device capable of recognizing a plurality of pieces of biometric information and using information on locations at which a plurality of pieces of biometric information is input as an authentication means together with the biometric information, and an authentication technique using the same.

In embodiments of the present disclosure, biometric information is limited to fingerprint information. However, fingerprint information is merely an example for describing embodiments of the present disclosure, and various types of biometric information may be applied.

In an embodiment of the present disclosure, an electronic device may include at least one of a smartphone, a tablet personal computer (PC), an e-book reader, a laptop PC, a netbook computer, a desktop PC, and wearable devices (e.g., a smart watch, smart glasses, a head-mounted device (HMD), electronic clothing, an electronic bracelet, an electronic necklace, a smart mirror, etc.), for example.

In another embodiment, the electronic device may include at least one of a portable medical device (e.g., a blood glucose monitor, a heart rate monitor, a blood pressure monitor, a body temperature monitor, or the like), a navigation device, an automobile infotainment device, electronic equipment for ships (e.g., a navigation device for ships, a gyrocompass, etc.), avionics, a security device, a head unit for vehicles, a point of sales (POS) in a store, and an Internet-of-things device.

An electronic device according to an embodiment of the present disclosure is not limited to the aforementioned devices and may include new electronic devices according to technological development.

Hereinafter, embodiments of the present disclosure will be described in detail with reference to the accompanying drawings.

FIG. 1 is a configuration diagram of an electronic device 1 according to an embodiment of the present disclosure.

As shown in FIG. 1, the electronic device 1 according to an embodiment of the present disclosure may include a display module 10, a fingerprint information recognition module 20, a signal processor 100, a controller 200, and a storage 300.

The display module 10 is a module for displaying execution information regarding the electronic device 1 and may include a cover window, a display panel, a touch panel, and the like which are not shown. The display panel may include, for example, a liquid crystal display (LCD), a light emitting diode (LED), an organic LED (OLED), a micro-electro-mechanical system (MEMS), electronic paper, and the like, and may display a plurality of fingerprint information recognition areas for recognizing fingerprint information through the fingerprint information recognition module 20 which will be described later. The touch panel may be included in the display module and may convert touch input of a user into an electrical signal using a capacitive method, for example.

The fingerprint information recognition module 20 is connected to the display module 10 and can recognize a user's fingerprint contacting the surface of the display module 10. The fingerprint information recognition module 20 may include, for example, an ultrasonic fingerprint information recognition module. In this case, the fingerprint information recognition module 20 may generate and output ultrasonic waves directed to fingerprint information recognition areas of the display module 10, recognize ultrasonic waves reflected from the fingerprint of a user's finger, and determine the shape of the fingerprint. Although FIG. 1 shows that the fingerprint information recognition module 20 is disposed under the display module 10, this is merely an example to aid in understanding the embodiment and the fingerprint information recognition module 20 may be included in the electronic device 1 in various forms such as being integrated with the display module 10 or being disposed on the edge of the electronic device 1.

The signal processor 100 may detect user's touch or pattern dragging from an electrical signal according to touch input or pattern dragging input applied to the display module 10 and process a value received from the fingerprint information recognition module 20 to read a fingerprint pattern of the user. In addition, the signal processor 100 may generate a plurality of fingerprint information recognition areas for recognizing fingerprint information of the user through the fingerprint information recognition module 20.

Figure 2:
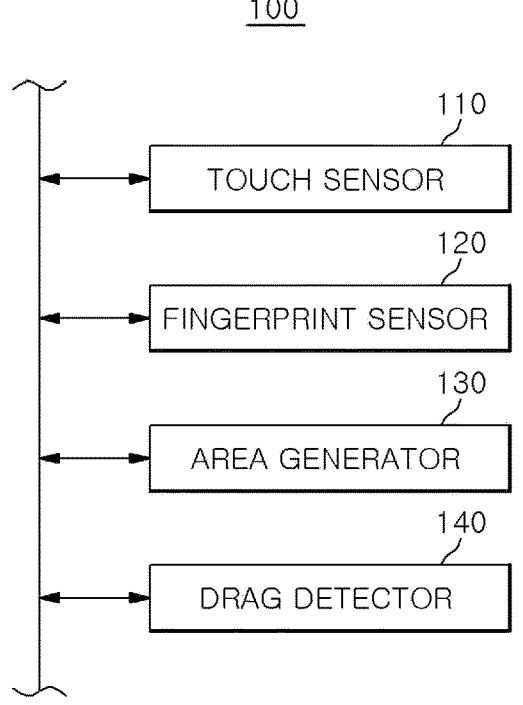
FIG. 2 is a block diagram for describing functions of a signal processor 100 of FIG. 1 in detail.

FIG. 2 is a block diagram for describing functions of the signal processor 100 of FIG. 1 in detail.

As shown in FIG. 2, the signal processor 100 may include a touch sensor 110, a fingerprint sensor 120, an area generator 130 and a drag detector 140.

The touch sensor 110 may detect a user's touch operation from an electrical signal according to user's touch input through the display module 10.

The fingerprint sensor 120 may be electrically connected to the fingerprint information recognition module 20 and may process a value received from the fingerprint information recognition module 20 to read a fingerprint pattern of the user.

The area generator 130 may generate a plurality of fingerprint information recognition areas and a plurality of drag points to be displayed on the display module 10.

The drag detector 140 may detect a pattern dragging operation of the user from an electrical signal according to pattern dragging input of the user through the display module 10.

Referring back to FIG. 1, the controller 200 may include, for example, a microprocessor-based control processing unit, a graphics processing unit, and the like and may be implemented by an electronic device having at least one core. The controller 200 can read and select data or instructions stored in the storage 300 which will be described later, and record newly input data or instructions on the storage 300. Further, the controller 200 may modify or delete data or instructions that have already been recorded.

In particular, the controller 200 may control a plurality of fingerprint information recognition areas to be output on the display module 10, and if fingerprint information is recognized in at least one of the fingerprint information recognition areas through the fingerprint information recognition module 20, register the fingerprint information and location information on the at least one fingerprint information recognition area in the storage 300 as authentication information. In addition, the controller 200 may generate a plurality of drag points and display the same on the display module 10 if pattern registration is requested after the fingerprint information and the location information on the fingerprint information recognition area are registered, and if pattern information on the drag points is input through the touch panel of the display module 10 from the fingerprint information recognition area, additionally register the pattern information as authentication information. In this case, additional registration may include a process of registering execution information regarding a specific application of the electronic device 1.

In addition, the controller 200 may control a plurality of fingerprint information recognition areas to be displayed on the display module 10, determine whether fingerprint information is pre-registered authentication information and whether at least one of the fingerprint information recognition areas is pre-registered location information if the fingerprint information is recognized in the at least one fingerprint information recognition area through the fingerprint information recognition module 20, and permit authentication of use of the electronic device 1 if the fingerprint information is pre-registered authentication information and the at least one fingerprint information recognition area is pre-registered location information. In addition, the controller 200 may determine whether pre-registered pattern information is present after permitting authentication of use of the electronic device 1, generate a plurality of drag points and display the same on the display module 10, and if pre-registered pattern information is present, determine whether pattern information on the drag points is input through the touch panel of the display module 10 from the fingerprint information recognition area where the fingerprint information is recognized, and permit user authentication for a specific application of the electronic device 1 if the pattern information input through the touch panel matches the pre-registered pattern information.

Here, a fingerprint information recognition area may correspond to location information on the display module 10, and a plurality of fingerprint information recognition areas may be displayed in a lattice form in at least a partial area of the display module 10. This fingerprint information recognition area will be described in detail later with reference to FIGS. 2 to 8.

The storage 300 stores at least one instruction or data executable by the controller 200, and stored instructions or data may be selected by the controller 200. The storage 300 may include, for example, a RAM, a ROM, and the like and may store location information on the display module 10 representing a plurality of fingerprint information recognition areas, pattern information on patterns dragged from location information of fingerprint recognition areas, a computer program including instructions for causing the controller 200 to perform authentication registration for fingerprint registration, a computer program including instructions for causing the controller 200 to perform authentication through fingerprint recognition, and the like according to an embodiment of the present disclosure.

Hereinafter, a method of registering authentication of use of the electronic device 1 and a method of authenticating use of the electronic device 1 according to an embodiment of the present disclosure will be described in detail along with the above-described configuration with reference to FIGS. 3 to 8.

Figure 3:
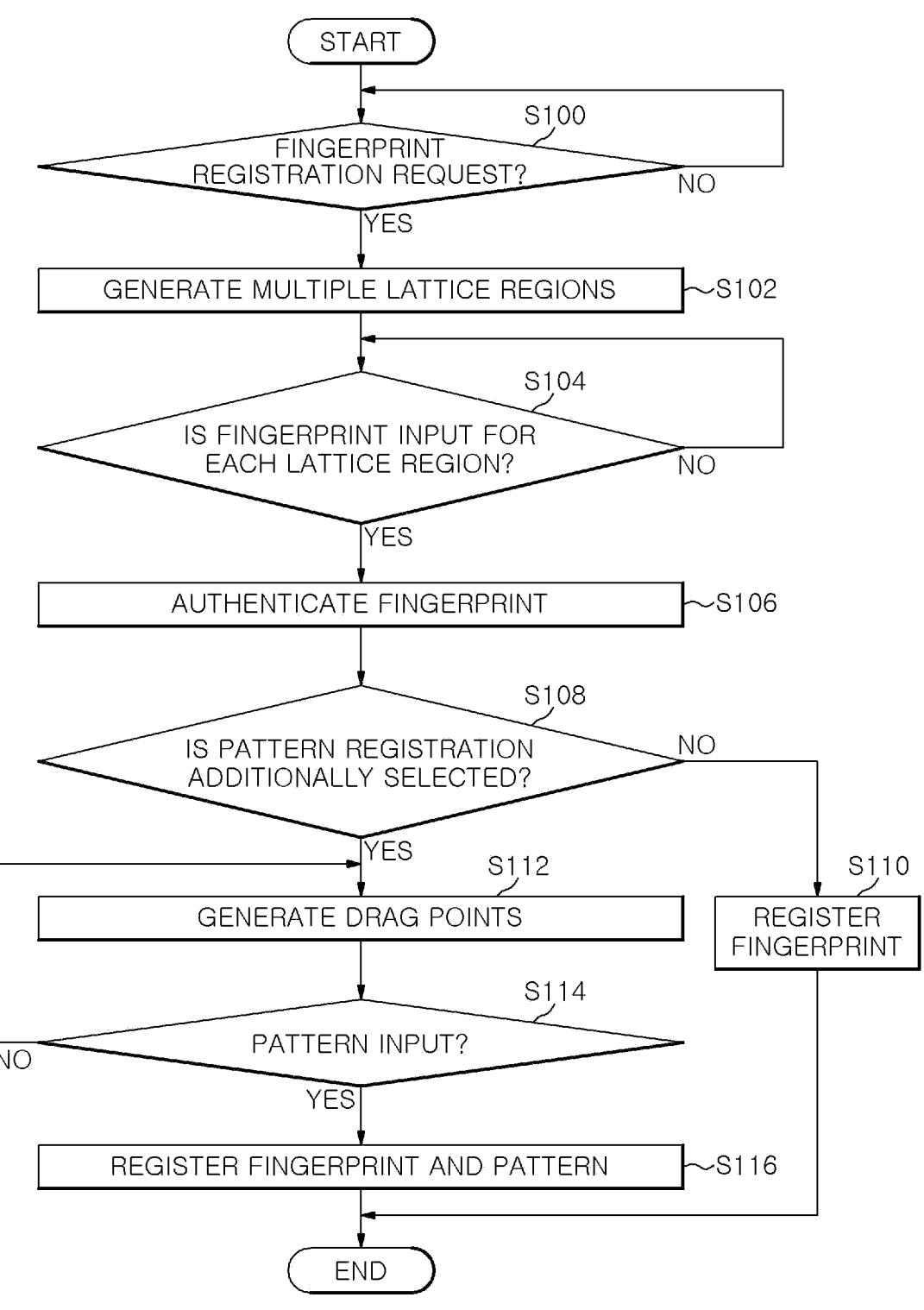
FIG. 3 is a flowchart illustrating a method of registering authentication information of the electronic device of FIG. 1 according to an embodiment of the present disclosure.

FIG. 3 is a flowchart illustrating a method of registering authentication of use of electronic device 1 according to an embodiment of the present disclosure.

As shown in FIG. 3, when the electronic device 1 is requested to perform fingerprint registration (S100), the controller 200 of the electronic device 1 may generate a plurality of fingerprint information recognition areas on the display module 10 (S102). Here, the plurality of fingerprint information recognition areas means areas for recognizing a fingerprint of a user as a plurality of fingerprints at specific locations of the display module 10. In the embodiment of the present disclosure, a plurality of various fingerprint recognition locations is set in order to maintain enhanced security during fingerprint information registration.

Figure 4:
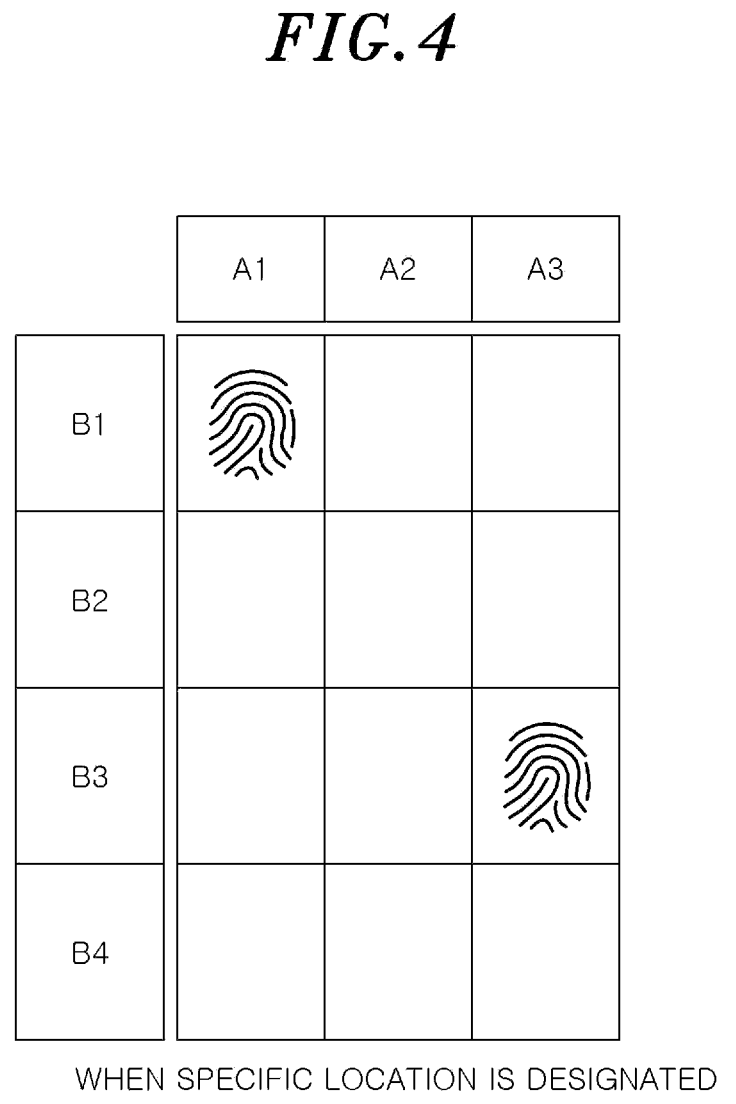

FIG. 4 is a diagram illustrating such a plurality of fingerprint information recognition areas.

As shown in FIG. 4, the plurality of fingerprint information recognition areas may be areas in which at least two fingerprint images are displayed on the display panel.

Further, the two fingerprint information recognition areas may be areas displayed in a lattice form on the display panel.

A fingerprint image or a lattice form is a user interface (UI) environment that induces a user to perform fingerprint registration more intuitively and easily. Various forms, such as an oval and a polygon in addition to the lattice form may be selectively employed according to the hardware environment and interface environment of the electronic device 1.

In the embodiment shown in FIG. 4, a lattice having 12 regions is formed, and two pieces of fingerprint information may be input to (recognized in) regions corresponding to specific locations among the 12 regions. Each lattice region may have indexes according to a column and a row. For example, first fingerprint information may be input at a position (A1, B1) of the display module 10, and second fingerprint information may be input at a position (A3, B3).

Here, the 12 lattice regions may be displayed over the entire area of the display panel of the display module 10, or may be displayed in a partial area of the display panel as needed.

When fingerprint information is input for each fingerprint information recognition area in the lattice form as shown in FIG. 4 (S104), the controller 200 may store the input fingerprint information together with location information of a point where the fingerprint information is input in the storage 300 to register the same as authentication information (S106). Here, the controller 200 may determine whether the input fingerprint information is fingerprint information pre-registered in the storage 300, and if the input fingerprint information is pre-registered fingerprint information, store only the information on the fingerprint information recognition area (location information on the display panel) in the storage 300 to register the same as authentication information. If the input fingerprint information is pre-registered fingerprint information, the location information on the fingerprint information recognition area may be additionally selected by the user.

In the embodiment of the present disclosure, when registration of the fingerprint information is completed, the controller 200 may determine whether pattern registration is requested (S108). Requesting pattern registration is a process of inducing registration of pattern information through input applied to the touch panel in addition to registration of fingerprint information. If there is no pattern registration request, only the fingerprint information may be registered (S110).

When there is a pattern registration request, the controller 200 may generate a plurality of drag points and display the same on the display module 10 (S112).

Figure 5:
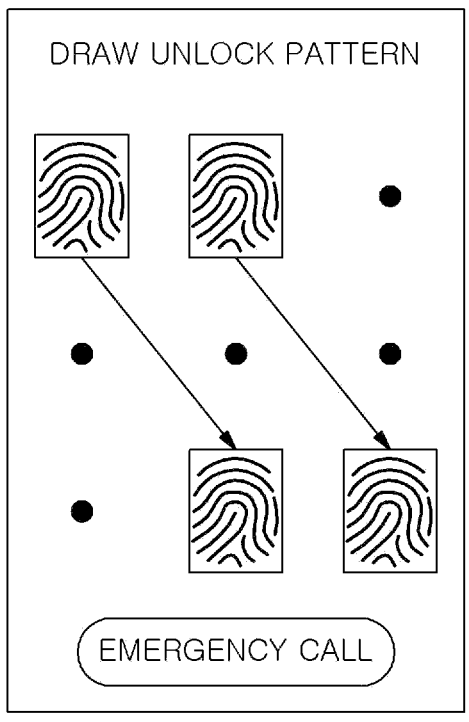
FIG. 5 is a diagram illustrating drag points in the authentication information registration method of FIG. 3.

FIG. 5 is a diagram illustrating drag points.

As shown in FIG. 5, drag points may be represented as a plurality of dot areas. The plurality of dot areas is display areas for inducing pattern input of a user.

In the embodiment of the present disclosure, it is possible to induce pattern information to be input at locations on the display module 10 corresponding to the fingerprint information recognition areas input in step S104 rather than inducing pattern input at arbitrary points in the plurality of dot areas.

As shown in FIG. 5, when pattern information is input at the locations of the fingerprint information recognition areas (S114), the controller 200 may store the pattern information together with the fingerprint information registered in step S110 in the storage 300 to register the same as authentication information (S116). Here, in the process of storing the pattern information, execution information regarding a specific application selected by the user may also be registered as authentication information. That is, authentication information in the embodiment of the present disclosure may be divided into 1) authentication information including fingerprint information, 2) authentication information including fingerprint information and pattern information, and 3) authentication information including fingerprint information, pattern information, and application execution information.

Figure 6:
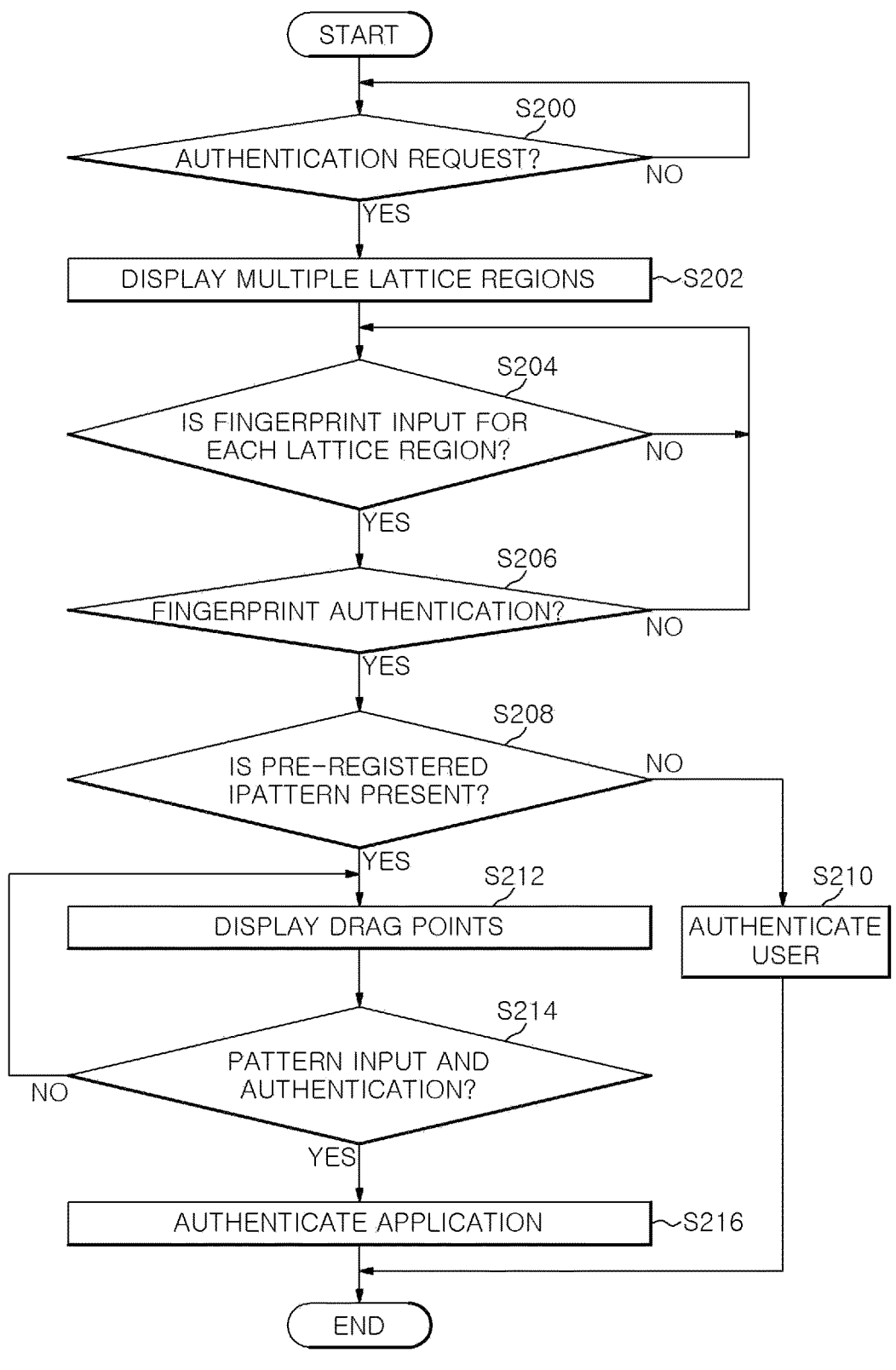
FIG. 6 is a flowchart illustrating a biometric authentication method of the electronic device of FIG. 1 according to an embodiment of the present disclosure.

FIG. 6 is a flowchart illustrating a method of authenticating use of the electronic device 1 according to an embodiment of the present disclosure.

As shown in FIG. 6, when an authentication request is sent to the electronic device 1 (S200), the controller 200 of the electronic device 1 may display a plurality of fingerprint information recognition areas stored in the storage 300 through the display module 10 (S202). Here, the plurality of fingerprint information recognition areas may include areas displayed in a lattice form in which lattice regions have different pieces of location information, as shown in FIG. 4.

In the embodiment of the present disclosure, a fingerprint information recognition area corresponding to each of the plurality of regions of the lattice as shown in FIG. 4 may be moved based on a relative location between lattice regions in a partial area of the display panel.

Figure 7:
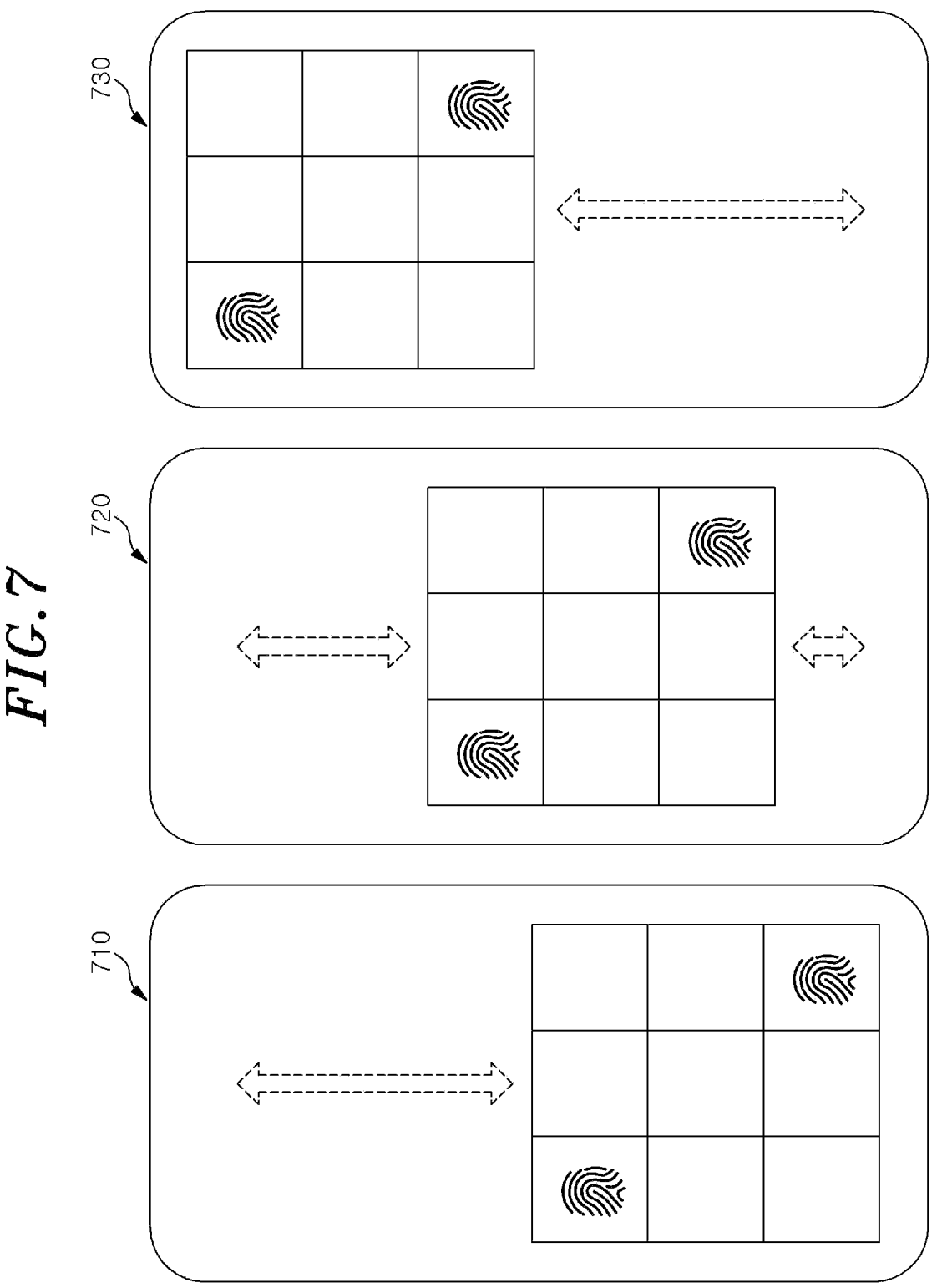
FIG. 7 is diagrams illustrating a case in which biometric information recognition areas are moved based on a relative location in the biometric authentication method of FIG. 6.

FIG. 7 is diagrams illustrating a case in which fingerprint information recognition areas in a lattice form having a plurality of regions are moved based on a relative location on the display panel.

A first UI environment 710 illustrates a case where fingerprint information recognition areas in a lattice form are displayed in the lower part of the display panel. A second UI environment 720 illustrates a case where the fingerprint information recognition areas in a lattice form are displayed at the center of the display panel. A third UI environment 730 illustrates a case where the fingerprint recognition areas in a lattice form are displayed in the upper part of the display panel. In this case, even if the location of the lattice is changed on the display panel as shown inthe UI environments 710, 720, 730, index information on each lattice region can be maintained.

In this manner, the entire location of the fingerprint information recognition areas in a lattice form is changed during authentication of the electronic device 1 such that fingerprints remaining during authentication registration or authentication of the electronic device 1 are expressed at various locations as much as possible in order to minimize security vulnerability in fingerprint input location.

When a fingerprint for each lattice region is input to the fingerprint information recognition areas in a lattice form at various locations (S204), the controller 200 may determine whether the input fingerprint information is authentication information pre-registered in the storage 300 and whether the fingerprint information recognition areas are location information pre-registered in the storage 300 (S206).

If the input fingerprint information is pre-registered authentication information and the fingerprint information recognition areas are pre-registered location information, the controller 200 may permit authentication of use of the electronic device 1.

The controller 200 may determine whether pre-registered pattern information is present in the storage 300 after permitting authentication in step S210 (S208). The controller 200 may end this process after permitting authentication of use of the electronic device 1 if the pre-registered pattern information is not present in the storage 300 and may proceed to step S212 if the pre-registered pattern information is present in the storage 300.

In step S212, the controller 200 may display a plurality of drag points on the display panel (S212).

Figure 8:
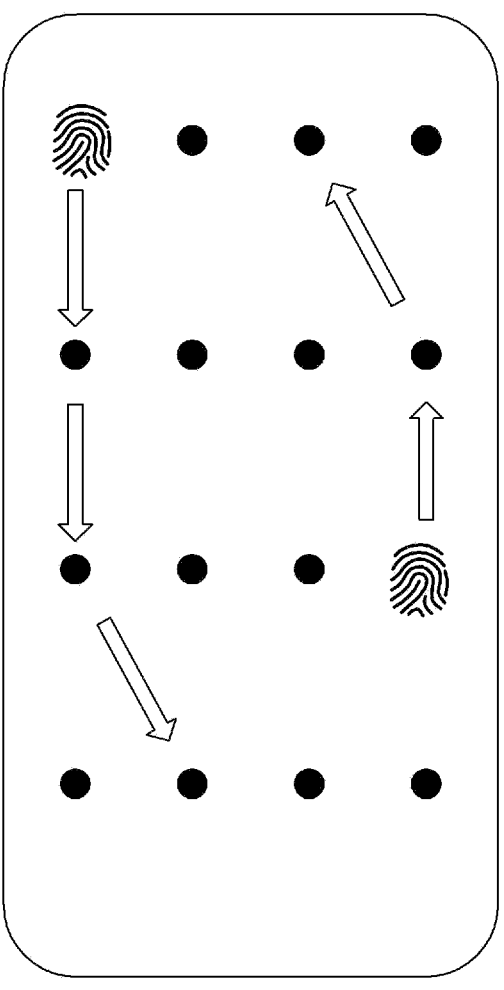
FIG. 8 is a diagram illustrating a biometric authentication method using pattern dragging after biometric information authentication in the biometric authentication method of FIG. 6.

FIG. 8 is a diagram illustrating a plurality of drag points for additionally performing authentication by pattern dragging after authentication through fingerprint information.

As shown in FIG. 8, the drag points may be represented as a plurality of dot areas. The plurality of dot areas is display areas for inducing a user's pattern input.

In the embodiment of the present disclosure, it is possible to induce pattern information to be input at a location on the display module 10 corresponding to a fingerprint information recognition area for each lattice region input in step S204 rather than inducing pattern input at arbitrary points in the plurality of dot areas.

When pattern information is input at the locations of the fingerprint information recognition areas as shown in FIG. 8, the controller 200 may select pattern information together with the fingerprint information registered in step S110 from the storage 300 and determine whether the input pattern information matches the pattern information registered in the storage 300 (S214).

If the input pattern information matches the pattern information registered in the storage 300, the controller 200 may permit authentication for a specific application of the electronic device 1 (S216). That is, the controller 200 may permit authentication to use the specific application such that the application pre-registered in the storage 300 can be executed if the input pattern information matches the pattern information registered in the storage 300.

As described above, authentication information in the embodiment of the present disclosure may be divided into 1) authentication information including fingerprint information, 2) authentication information including fingerprint information and pattern information, 3) authentication information including fingerprint information, pattern information, and application execution information, and it is possible to select necessary authentication information according to the execution environment and the security environment of the electronic device 1.

According to the embodiment of the present disclosure as described above, it is possible to input a plurality of pieces of biometric information, register, as authentication information, information on locations at which a plurality of pieces of biometric information is input together with the biometric information, and use a plurality of pieces of biometric information recognized at various locations for authentication, thereby enhancing security of an electronic device. In particular, it is expected that security can be further enhanced in platform environments such as electronic financial transaction systems and electronic commerce systems through a method of authenticating single or multiple fingerprints at a specific location of the electronic device.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method of performing a biometric authentication of an electronic device, comprising:

displaying a plurality of biometric information recognition areas on a display module of the electronic device and a fingerprint image within one of the plurality of biometric information recognition areas to indicate a pre-registered location of a fingerprint input, wherein the plurality of biometric information recognition areas is movably displayed on the display module for each session of the biometric authentication of the electronic device to reduce a concentration of fingerprints applied to the pre-registered location on the plurality of biometric information recognition areas for security purpose;

permitting an access to the electronic device when both a biometric information of the fingerprint input and a location of the fingerprint input match with a biometric information of a pre-registered fingerprint and the pre-registered location, respectively;

displaying, subsequent to the permitting the access to the electronic device, a plurality of dot areas to prompt a pattern input; and executing an application of the electronic device in response to a receipt of the pattern input on the plurality of dot areas and an authentication of the pattern input with a pre-registered pattern configured for the application.

2. The method of claim 1, wherein the plurality of biometric information recognition areas includes a plurality of lattice regions having each location information on the display module.

3. The method of claim 1, wherein the pre-registered pattern is generated by:

determining a request of a pattern registration;

displaying a plurality of drag points on the display module;

determining a user drag input of connecting the plurality of drag points on the display module; and generating the pre-registered pattern corresponding to the user drag input.

4. The method of claim 1, wherein the biometric information of the fingerprint input is authenticated when the biometric information of the fingerprint input is same as the biometric information of the pre-registered fingerprint.

5. The method of claim 4, wherein the location of the fingerprint input is compared with the pre-registered location once the biometric information of the fingerprint input matches with the biometric information of the pre-registered fingerprint.

6. A non-transitory computer readable storage medium storing computer executable instructions, wherein the instructions, when executed by a processor, cause the processor to perform a biometric authentication method of an electronic device, the method comprising:

displaying a plurality of biometric information recognition areas on a display module of the electronic device and a fingerprint image within one of the plurality of biometric information recognition areas to indicate a pre-registered location of a fingerprint input, wherein the plurality of biometric information recognition areas is movably displayed on the display module for each session of a biometric authentication of the electronic device to reduce a concentration of fingerprints applied to the pre-registered location on the plurality of biometric information recognition areas for security purpose;

permitting an access to the electronic device when both a biometric information of the fingerprint input and a location of the fingerprint input match with a biometric information of a pre-registered fingerprint and the pre-registered location, respectively;

displaying, subsequent to the permitting the access to the electronic device, a plurality of dot areas to prompt a pattern input; and executing an application of the electronic device in response to a receipt of the pattern input on the plurality of dot areas and an authentication of the pattern input with a pre-registered pattern configured for the application.

7. The non-transitory computer readable storage medium of claim 6, wherein the plurality of biometric information recognition areas includes a plurality of lattice regions having each location information on a partial area in the display module.

8. The non-transitory computer readable storage medium of claim 7, wherein each lattice region has indexes according to a column and a row based on a relative location between the plurality of lattice regions on the partial area, and information on the indexes is maintained even if the plurality of lattice regions is moved on the partial area.

9. The non-transitory computer readable storage medium of claim 6, wherein the pre-registered pattern is generated by:

determining whether pre-registered pattern information is present;

displaying a plurality of drag points on the display module;

determining a user drag input of connecting the plurality of drag points on the display module; and generating the pre-registered pattern corresponding to the user drag input.

10. An electronic device comprising:

a display module;

a biometric information recognition module included in the display module;

a signal processor configured to generate a plurality of biometric information recognition areas for recognizing biometric information on the biometric information recognition module;

a memory configured to store one or more instructions; and a processor configured to execute the one or more instructions stored in the memory, wherein the instructions, when executed by the processor, cause the processor to:

display a plurality of biometric information recognition areas on a display module of the electronic device and a fingerprint image within one of the plurality of biometric information recognition areas to indicate a pre-registered location of a fingerprint input, wherein the plurality of biometric information recognition areas is movably displayed on the display module for each session of a biometric authentication of the electronic device to reduce a concentration of fingerprints applied to the pre-registered location on the plurality of biometric information recognition areas for security purpose;

permit an access to the electronic device when both a biometric information of the fingerprint input and a location of the fingerprint input match with a biometric information of a pre-registered fingerprint and the pre-registered location, respectively;

display, subsequent to the permitting the access to the electronic device, a plurality of dot areas to prompt a pattern input; and execute an application of the electronic device in response to a receipt of the pattern input on the plurality of dot areas and an authentication of the pattern input with a pre-registered pattern configured for the application.

11. The electronic device of claim 10, wherein the processor is configured to control the plurality of biometric information recognition areas to be displayed in a lattice form in which lattice regions have each location information at a partial area of the display module.

12. The electronic device of claim 11, wherein the processor is configured to control the display module such that the lattice regions in the lattice form are moved based on a relative location between lattice regions in the partial area, wherein each lattice region has indexes according to a column and a row, and wherein information on the indexes is maintained even if the lattice form is moved in the partial area.

13. The electronic device of claim 10, wherein the processor is configured to:

determine a request of a pattern registration;

display a plurality of drag points on the display module;

determine a user drag input of connecting the plurality of drag points on the display module, and generating the pre-registered pattern corresponding to the user drag input.

14. The electronic device of claim 13 wherein biometric information of the fingerprint input is authenticated when the biometric information of the fingerprint input is same as the biometric information of the pre-registered fingerprint.

15. The electronic device of claim 14, wherein the location of the fingerprint input is compared with the pre-registered location once the biometric information of the fingerprint input matches with the biometric information of the pre-registered fingerprint.

* * * * *